United States Patent
Cabrita Condessa et al.

(10) Patent No.: US 11,521,124 B2
(45) Date of Patent: Dec. 6, 2022

(54) RECIPROCATING GENERATIVE MODELS

(71) Applicant: Robert Bosch GmbH, Stuttgart (DE)

(72) Inventors: Filipe J. Cabrita Condessa, Pittsburgh, PA (US); Jeremy Z. Kolter, Pittsburgh, PA (US)

(73) Assignee: Robert Bosch GmbH, Stuttgart (DE)

( * ) Notice: Subject to any disclaimer, the term of this patent is extended or adjusted under 35 U.S.C. 154(b) by 537 days.

(21) Appl. No.: 16/713,229

(22) Filed: Dec. 13, 2019

(65) Prior Publication Data

US 2021/0182731 A1    Jun. 17, 2021

(51) Int. Cl.
*G06N 20/00* (2019.01)
*G06F 17/18* (2006.01)
*G06K 9/62* (2022.01)

(52) U.S. Cl.
CPC ............. *G06N 20/00* (2019.01); *G06F 17/18* (2013.01); *G06K 9/628* (2013.01); *G06K 9/6256* (2013.01)

(58) Field of Classification Search
CPC ...... G06N 20/00; G06F 17/18; G06K 9/6256; G06K 9/628
USPC ......................................................... 706/12
See application file for complete search history.

(56) References Cited

U.S. PATENT DOCUMENTS

| | | | |
|---|---|---|---|
| 7,680,341 B2 | 3/2010 | Perronnin | |
| 11,397,421 B2* | 7/2022 | Cella | G05B 19/41865 |
| 11,397,422 B2* | 7/2022 | Cella | H04L 1/18 |
| 11,397,428 B2* | 7/2022 | Cella | G06K 9/6262 |
| 2019/0121350 A1* | 4/2019 | Cella | G05B 19/4185 |
| 2019/0171187 A1* | 6/2019 | Cella | G06N 20/00 |
| 2019/0324444 A1* | 10/2019 | Cella | G06N 3/0472 |
| 2021/0141995 A1* | 5/2021 | Lundgaard | G06N 3/08 |
| 2021/0142160 A1* | 5/2021 | Mohseni | G06N 5/04 |

FOREIGN PATENT DOCUMENTS

WO    2018200979 A1    11/2018

OTHER PUBLICATIONS

Ingma et al., Semi-Supervised Learning With Deep Generative Models, 2014 arXiv:1406.5298v2 [cs.LG] Oct. 31, 2014.
Makhzani et al., Adversarial Autoencoders, 2015 arXiv:1511 05644v2 [cs.LG] May 25, 2016.

* cited by examiner

*Primary Examiner* — William D Titcomb
(74) *Attorney, Agent, or Firm* — Brooks Kushman P.C.

(57) ABSTRACT

For each generative model of a set of K generative models that classifies sensor data into K classes, in-distribution samples are sampled from training data as being classified as belonging to the class of the generative model and out-of-distribution samples are sampled from the training data as being classified as not belonging to the class of the generative model. Out-of-distribution samples are also generated from each remaining reciprocal generative model in the set of reciprocating generative models excluding the generative model to provide additional samples classified as not belonging to the class of the generative model. Parameters of the generative model are updated to minimize a loss function to maximize likelihood of the samples belonging to the class, and to maximize the loss function on both the sampled out-of-distribution samples and the generated out-of-distribution samples to minimize likelihood of the samples not belonging to the class.

18 Claims, 3 Drawing Sheets

RECIPROCATING GENERATIVE MODELS

TECHNICAL FIELD

Aspects of the present disclosure relate to reciprocating generative models.

BACKGROUND

A generative model learns a joint probability distribution p(x,y), while a discriminative model learns a conditional probability distribution p(x|y). The discriminative distribution p(x|y) may be used to directly classify an example x into a class y. However, a generative model may be used to fit an example into each class separately with a probability distribution. When classifying a new point, the generative model may be used to find out in which distribution the point is most probable to come from.

There exists a significant body of work focused on the application of deep generative models for classification tasks. Two representative examples include "Semi-supervised Learning with Deep Generative Models," Kingma, Rezende, Mohamed, Welling, 2014 arXiv 1406.5298, and "Adversarial Autoencoders," Makhzani, Shlens, Jaitly, Goodfellow, Frei, 2015 arXiv 1511.05644.

SUMMARY

According to one or more illustrative examples, a method is used for training a set of reciprocating generative models for K classes. A set of K generative models that classifies sensor data into the K classes is initialized, such that when trained, each of the generative models of the set of K generative models is configured to classify an example in or out of a respective one of the K classes. For each generative model of the K generative models, in-distribution samples as sampled from training data for the generative model as being classified as belonging to the class of the generative model, out-of-distribution samples are sampled from the training data for the generative model as being classified as not belonging to the class of the generative model, and out-of-distribution samples are generated from each remaining reciprocal generative model in the set of reciprocating generative models excluding the generative model to provide additional samples classified as not belonging to the class of the generative model. Parameters of the generative model are updated according to the in-distribution samples, the out-of-distribution samples, and the generated out-of-distribution samples, to minimize a loss function on the in-distribution samples to maximize likelihood of the samples belonging to the class of the generative model, and to maximize the loss function on both the sampled out-of-distribution samples and the generated out-of-distribution samples to minimize likelihood of the samples not belonging to the class of the generative model. The set of K generative models, as trained, are used to classify sensor data with respect to the K classes.

According to one or more illustrative examples, a system for training a set of reciprocating generative models for K classes is provided. The system includes a processor of a computing device, the processor programmed to initialize a set of K generative models that classifies sensor data into the K classes, such that when trained, each of the generative models of the set of K generative models is configured to classify an example in or out of a respective one of the K classes. The processor is further programmed to, for each generative model of the K generative models, sample, from training data, in-distribution samples for the generative model as being classified as belonging to the class of the generative model, sample, from the training data, out-of-distribution samples for the generative model as being classified as not belonging to the class of the generative model, generate out-of-distribution samples from each remaining reciprocal generative model in the set of reciprocating generative models excluding the generative model to provide additional samples classified as not belonging to the class of the generative model, and update parameters of the generative model, according to the in-distribution samples, the out-of-distribution samples, and the generated out-of-distribution samples, to minimize a loss function on the in-distribution samples to maximize likelihood of the samples belonging to the class of the generative model, and to maximize the loss function on both the sampled out-of-distribution samples and the generated out-of-distribution samples to minimize likelihood of the samples not belonging to the class of the generative model. The processor is also programmed to utilize the set of K generative models, as trained, to classify sensor data with respect to the K classes.

According to one or more illustrative examples, non-transitory computer-readable medium includes instructions for training a set of reciprocating generative models for K classes that, when executed by a processor, cause the processor to perform operations. The operations include to initialize a set of K generative models that classifies sensor data into the K classes, such that when trained, each of the generative models of the set of K generative models is configured to classify an example in or out of a respective one of the K classes. The operations further include, for each generative model of the K generative models, to sample, from training data, in-distribution samples for the generative model as being classified as belonging to the class of the generative model, sample, from the training data, out-of-distribution samples for the generative model as being classified as not belonging to the class of the generative model, generate out-of-distribution samples from each remaining reciprocal generative model in the set of reciprocating generative models excluding the generative model to provide additional samples classified as not belonging to the class of the generative model, and update parameters of the generative model, according to the in-distribution samples, the out-of-distribution samples, and the generated out-of-distribution samples, to minimize a loss function on the in-distribution samples to maximize likelihood of the samples belonging to the class of the generative model, and to maximize the loss function on both the sampled out-of-distribution samples and the generated out-of-distribution samples to minimize likelihood of the samples not belonging to the class of the generative model. The operations further include to utilize the set of K generative models, as trained, to classify sensor data with respect to the K classes.

DETAILED DESCRIPTION

Figure 1:
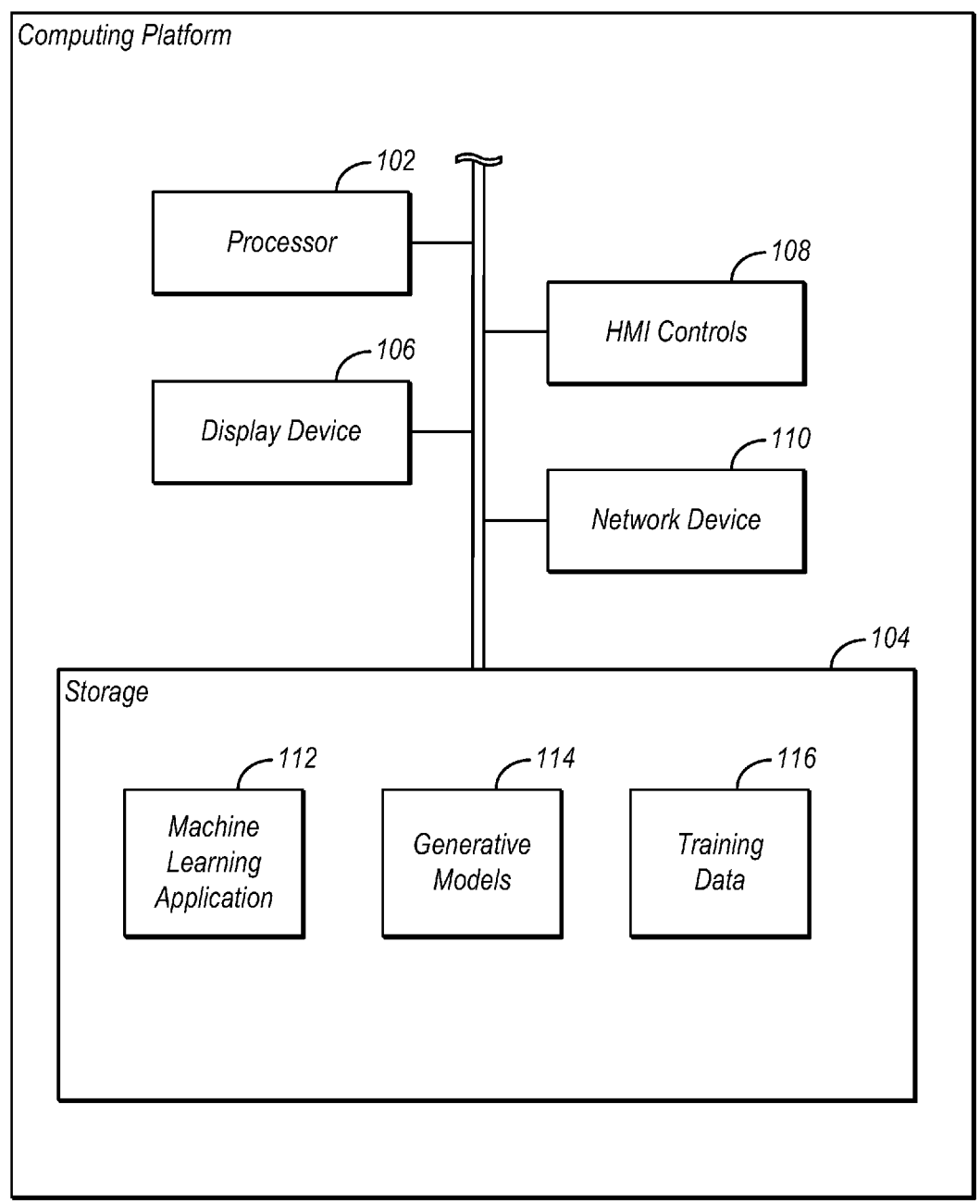
FIG. 1 is a schematic diagram of an exemplary embodiment of a system for the training and use of reciprocating generative models.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

As discussed in detail herein, an approach is described for training generative models and deep generative models for their application in classification with a reciprocating principle, where a loss function is maximized on out-of-distribution samples (either from a training set and/or generated) and a loss function is minimized on in-distribution samples.

Generative models, i.e., models that model the joint distribution p(x,y) of the samples x coming from a sensor and the associated labels y, have long been used to address the classification of sensor data. Given a multi-class problem (where y can take one of K values, each denoting a different class) K different generative models can be trained, where each of the K generative models returns $p_k(x)$, the likelihood that sample x originated from the distribution associated with the Kth class (with its distribution modeled by $p_k$). Models can also output samples generated from their distribution $x \sim f^k$.

One of the major barriers associated with the use of generative models, and in specific deep generative models (models that leverage deep neural network architectures), in their use in classification of sensor data is their inability to accurately identify out-of-distribution samples. This means that by training a generative model through the maximization of the likelihood of in-distribution samples, the system is at risk of also increasing the likelihood of out-of-distribution samples. The risk of high likelihood of out-of-distribution samples hinders the use of generative models as classifiers.

The disclosed approach formulates a method to train reciprocal generative models for classification of sensor data into K different classes, from a set of K generative models (one per class) and training data set $X=\{(x_1, y_1), \ldots, (x_n, y_n)\}$. For each class j, a training procedure trains the respective generative model by simultaneously: 1) minimizing the loss term L with respect to the parameters $\theta_j$ of the generative model across the expected value of the distribution of in-distribution samples, $x_i$ belonging to the jth class ($x_i=j$); and 2) maximizing the loss term L with respect to the parameters $\theta_j$ of the generative model across the expected value of the distribution of out-of-distribution samples, approximated both by samples drawn from the training set $x_i$ not belonging to the jth class ($y_i \neq j$) and by samples generated from the remaining K−1 generative models. Samples belonging to a class j contribute (positively) to the training of the jth generative model, as in-distribution samples, and contribute (negatively) to the training of the remaining generative models, as out-of-distribution samples.

Such techniques provide practical applications by being applicable to received sensor signals from a wide variety of sensors (such as video, radar, LiDAR, ultrasonic and/or motion sensors), and may be used to compute a control signal for controlling a physical system (such as a computer-controlled machine, like a robot, a vehicle, a domestic appliance, a power tool, a manufacturing machine, a personal assistant or an access control system). The described techniques do so by classifying the sensor data and explicitly training on in-distribution samples and finding a proxy for out-of-distribution samples.

FIG. 1 is a schematic diagram of an exemplary embodiment of a system 100 for the training and use of reciprocating generative models 114. The system 100 includes a processor 102 that is operatively connected to a memory 104, a display device 106, human-machine interface (HMI) controls 108, and a network device 110. As described in more detail below, during operation, the system 100 explicitly trains the generative model 114 to minimize a loss function on a set of in-distribution samples of training data 116, and to maximize a loss function on a set of out-of-distribution samples, including use of the training data 116 and generated data.

In the system 100, the processor 102 may include one or more integrated circuits that implement the functionality of a central processing unit (CPU) and/or graphics processing unit (GPU). In some examples, the processor 102 is a system on a chip (SoC) that integrates the functionality of the CPU and GPU. The SoC may optionally include other components such as, for example, the memory 104 and the network device 110 into a single integrated device. In other examples, the CPU and GPU are connected to each other via a peripheral connection device such as PCI express or another suitable peripheral data connection. In one example, the CPU is a commercially available central processing device that implements an instruction set such as one of the x86, ARM, Power, or MIPS instruction set families. Additionally, alternative embodiments of the processor 102 can include microcontrollers, application specific integrated circuits (ASICs), field programmable gate arrays (FPGAs), digital signal processors (DSPs), or any other suitable digital logic devices.

During operation, the processor 102 executes stored program instructions that are retrieved from the memory 104. The stored program instructions include software that controls the operation of the processor 102 to perform the operations described herein. The memory 104 may include both non-volatile memory and volatile memory devices. The non-volatile memory includes solid-state memories, such as NAND flash memory, magnetic and optical storage media, or any other suitable data storage device that retains data when the system 100 is deactivated or loses electrical power. The volatile memory includes static and dynamic random-access memory (RAM) that stores program instructions and data during operation of the system 100.

The GPU may include hardware and software for display of at least two-dimensional (2D) and optionally three-dimensional (3D) graphics to a display device 106. The display device 106 may include an electronic display screen, projector, printer, or any other suitable device that reproduces a graphical display. In some examples, the processor 102 executes software programs using the hardware functionality in the GPU to accelerate the performance of machine learning or other computing operations described herein.

The HMI controls 108 may include any of various devices that enable the system 100 to receive control input from workers or other users. Examples of suitable input devices that receive human interface inputs may include keyboards, mice, trackballs, touchscreens, voice input devices, graphics tablets, and the like.

The network device 110 may include any of various devices that enable the system 100 to send and/or receive data from external devices. Examples of suitable network devices 110 include a network adapter or peripheral interconnection device that receives data from another computer or external data storage device, which can be useful for receiving large sets of data in an efficient manner.

A machine learning application 112 may use various algorithms to perform aspects of the operations described herein. In an example, the machine learning application 112 may include instructions stored to the memory 104 and executable by the processor 102 as discussed above. Computer-executable instructions may be compiled or interpreted from computer programs created using a variety of programming languages and/or technologies, including, without limitation, and either alone or in combination, Java, C, C++, C#, Visual Basic, JavaScript, Python, Perl, PL/SQL, etc. In general, the processor 102 receives the instructions, e.g., from the memory 104, a computer-readable medium, etc., and executes these instructions, thereby performing one or more processes, including one or more of the processes described herein. Such instructions and other data may be stored and transmitted using a variety of computer-readable media.

In machine learning systems, model-based reasoning refers to an inference method that operates based on a machine learning model 114 of a worldview to be analyzed. Generally, the machine learning model 114 is trained to learn a function that provides a precise correlation between input values and output values. At runtime, a machine learning engine uses the knowledge encoded in the machine learning model 114 against observed data to derive conclusions such as a diagnosis or a prediction. An example machine learning library is the TensorFlow engine made available by Alphabet Inc. of Mountain View, Calif., although other machine learning systems may additionally or alternately be used.

Different categories of machine learning models 114 are in use. A generative model learns a joint probability distribution p(x,y), while a discriminative model learns a conditional probability distribution p(x|y). The discriminative distribution p(x|y) may be used to directly classify an example x into a class y. However, a generative model 114 may be used to fit an example into each class separately with a probability distribution. When classifying a new point, the generative model may be used to determine in which distribution the point is it most probable to come from.

As described herein the model 114 is a generative model 114. Regarding generative models 114, let f denote a machine learning system that classifies sensor data x into K classes. Let f be composed of K different generative models, $f=\{f^1, \ldots, f^K\}$, such that each individual generative model $f^i$ corresponds to a generative model that models the distribution of the ith class. In deep generative models 114, each generative model $f^i$ is modeled by a deep neural network parameterized by $\theta_i$, a vector of parameters of the deep neural network. From the generative model 114, the likelihood of a sample x being generated from the distribution associated with the ith class, $p_{\theta_i}(x)$ can be obtained, and the model 114 can generate samples from the distribution associated with the ith class, $x \sim f_{\theta_i}^i$.

The parameters for each model $\theta_i$ are estimated in a process in which the system 100 maximizes the expected value of the likelihood across samples from the training data 116 belonging to class i. Conversely, those models 114 can also be trained to minimize the negative log-likelihood across the samples from the training data 116 not belonging to class i, as follows:

$$\theta_i = \arg\min_\theta \mathbb{E}_{x \in X_i}[-\log p_{\theta_i}(x)], i = 1, \ldots, K$$

The expected value of the negative log likelihood can be interpreted as a loss function across the distribution of samples $L(\theta_i, X_i) = \mathbb{E}_{x \in X_i}[-\log p_{\theta_i}(x)]$.

The disclosure, accordingly, describes an approach to create reciprocal generative models 114 and reciprocal deep generative models 114 and how to train them from labeled training data 116. These models 114 are trained together as a set using training data 116 to simultaneously maximize the likelihood of samples originating from the target distribution and minimize the likelihood of samples originating from outside the target distribution. Each of the models 114 of the set of models 114 is responsible for a single class K.

Classification systems built upon reciprocal generative models 114 are able to achieve high performance levels while being robust to out-of-distribution samples or even distribution shift (where there is a shift on the characteristics of the distribution associated with the data and classes). This approach addresses significant gaps associated with the use of discriminative based models (non-robustness to out-of-distribution samples or distribution shift) while maintaining the high levels of performance often associated with discriminative models.

Figure 2:
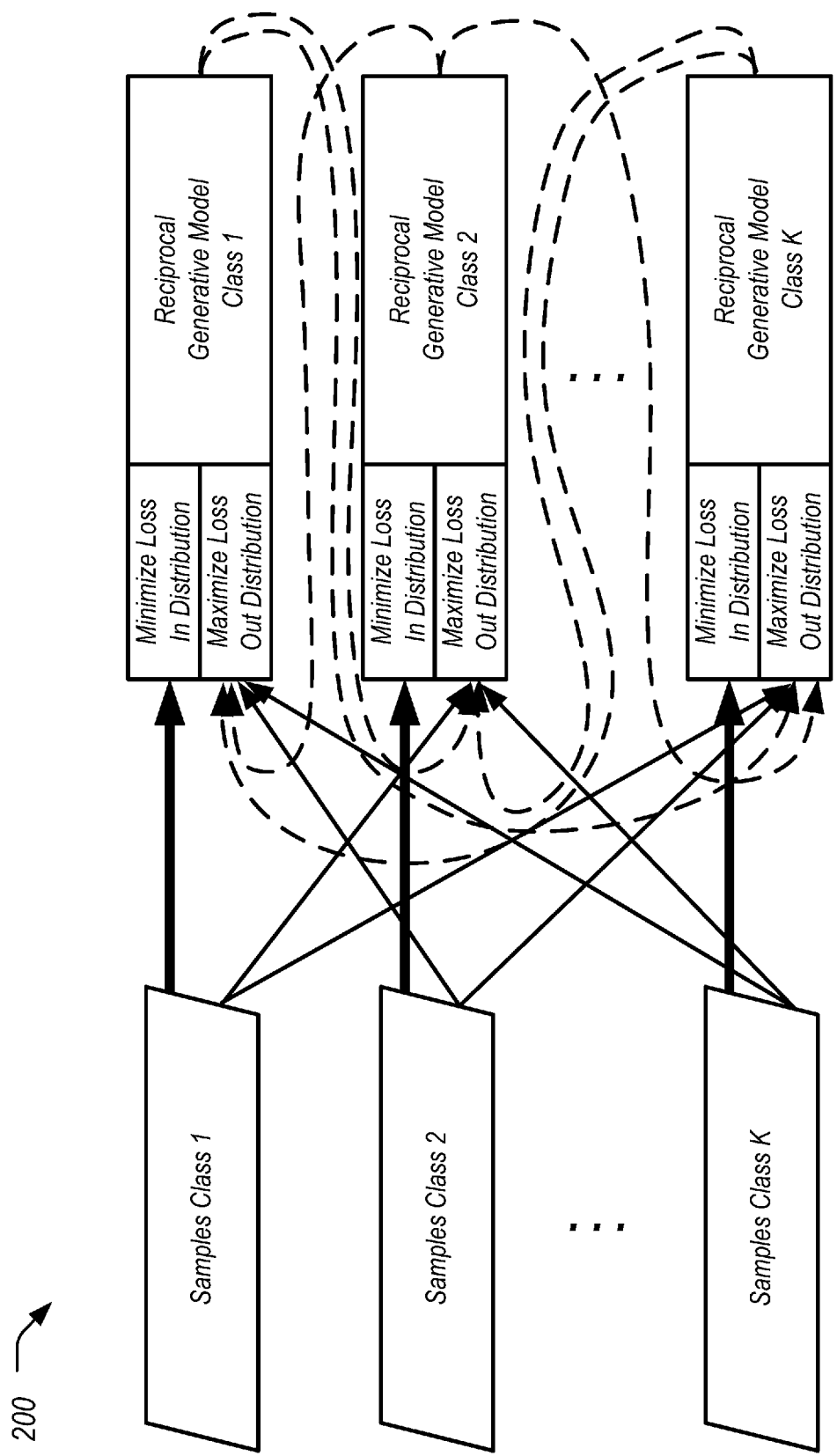
FIG. 2 is an example diagram of a training procedure for reciprocal generative models.

FIG. 2 is an example diagram of a training procedure 200 for reciprocal generative models 114. As shown, the thick solid arrows denote training examples on which loss is minimized (in-distribution training examples); the thin solid arrows denote training examples on which loss is maximized (out-of-distribution training examples); and the dashed arrows denote generated examples on which loss is minimized (synthetic out-of-distribution training examples).

Given a set of K generators, parameterized by $\theta_i$, for i=1, ..., K, the reciprocal generative models 114 can be built by ensuring that the loss function is minimized across samples from the ith class (in-distribution), and maximized across samples not originating from the ith class (out-of-distribution). The parameters for the individual reciprocal generative model 114 for the ith class, $\theta_i$, are obtained by optimizing two different tasks: 1) to minimize loss (maximize likelihood) on samples belonging to its ith class, thus accurately modeling samples from the target distribution; and 2) to maximize loss (minimize likelihood) on samples not belonging to the ith class, thus inaccurately modeling samples not originating from the target distribution. By promoting 2), the model 114 is minimizing its performance on a proxy of out-of-distribution samples, which is obtained by combining training samples from the remaining classes with generated samples from the remaining reciprocal generative models 114.

A training of reciprocal generative models 114 for K classes may be performed as follows. The inputs that are used may include a training set $X=\{(x_1, y_1), \ldots, (x_n, y_n)\}$ (e.g., the training data 116), a set of K (randomly) initialized generative models 114 ($f_i$, $\theta_i$, $p_{\theta_i}$), binary stopping condition S initialized at FALSE, balancing factor between in-distribution samples and out-of-distribution samples $\lambda$, and a balancing factor between real samples and synthethic samples $\tau_1$, $\tau_2$, loss function L.

With these inputs, the following procedure may be performed:
WHILE S is FALSE
FOR i in 1, ..., K
1—Sample in-distribution samples $X_{in} \subset X$ such that the label of each sampled sample is i
2—Sample out-of-distribution samples $X_{out} \subset X$ such that the label of each sampled sample is not i
3—Generate out-of-distribution samples from remaining reciprocal generative models $X_{out\_gen} = \{x \sim f_j, \forall_{i \neq j}\}$
4—Update parameters of ith reciprocal generative model $$\theta_i \leftarrow \arg\min_\theta L(\theta, X_{in}) - \lambda\left(\tau_1 L(\theta, X_{out}) + \tau_2 L(\theta, X_{outgen})\right)$$

Update Stopping Condition S

Accordingly, generative models 114 may be used that are explicitly trained to minimize a loss function on a set of in-distribution samples, and to maximize a loss function on a set of out-of-distribution samples, either from a training set or generated if the software for training the generative models 114 is available.

Figure 3:
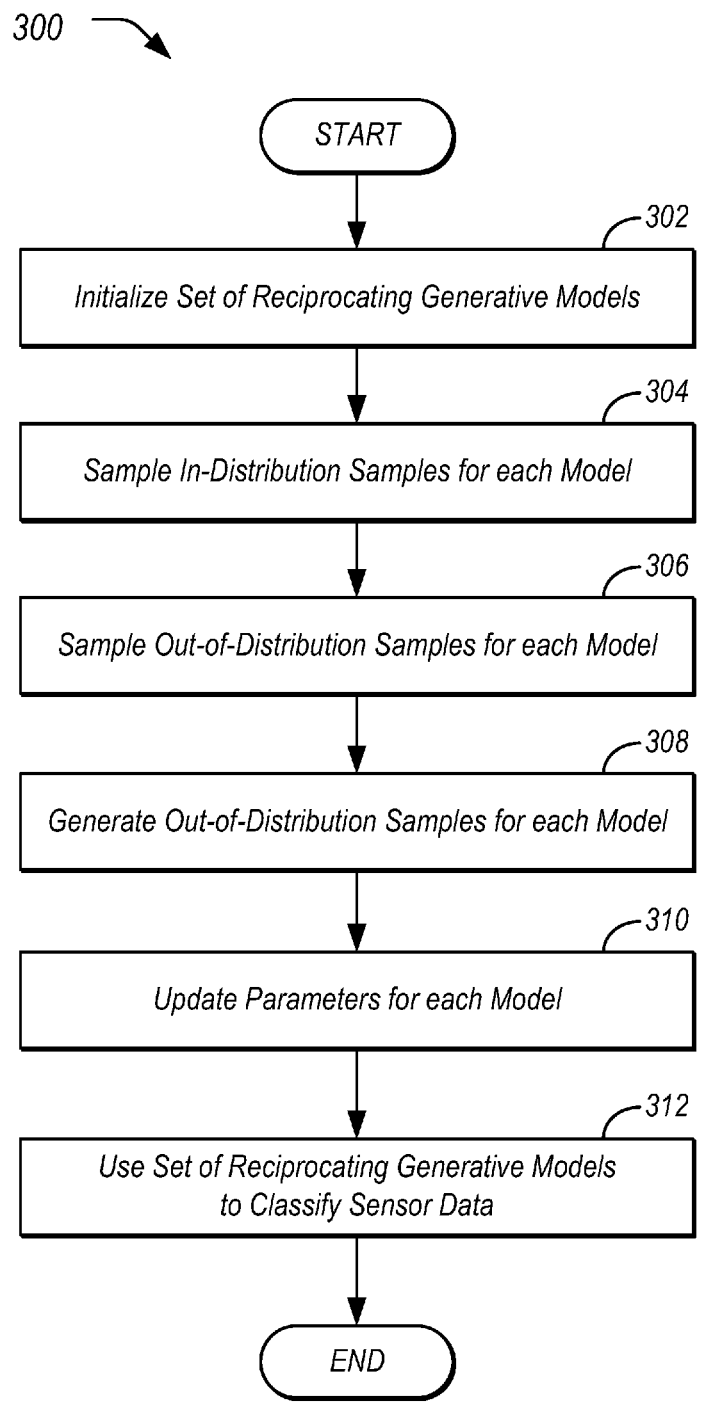
FIG. 3 is an example diagram of an exemplary embodiment of a process for the training and use of reciprocating generative models.

FIG. 3 is an example diagram of an exemplary embodiment of a process 300 for the training and use of reciprocating generative models 114. In an example, the process 300 may be performed using the system 100 following the training procedure 200.

At operation 302, a set of reciprocating generative models 114 are initialized. The set of K generative models may be configured to classify sensor data into the K classes, such that once trained, each of the generative models 114 of the set of K generative models 114 is configured to classify an example in or out of a respective one of the K classes.

At operation 304, in-distribution samples for each of the reciprocating generative models 114 are sampled. In an example, the in-distribution samples are pulled from the training data 116 as being samples that are classified as belonging to the class of the respective generative model 114.

At operation 306, out-of-distribution samples for each of the reciprocating generative models 114 are sampled. In an example, the out-of-distribution samples are pulled from the training data 116 as being samples that are classified as not belonging to the class of the respective generative model 114.

At operation 308, out-of-distribution samples are generated from each remaining reciprocal generative model 114 in the set of reciprocating generative models 114 excluding the generative model 114. These additional samples are generated as proxy to provide additional samples classified as not belonging to the class of the generative model 114. By using these additional generated samples, the ability of the generative models 114 to accurately identify out-of-distribution samples is improved.

At operation 310, the parameters of the generative model 114 are updated. The updating is performed according to the in-distribution samples, the out-of-distribution samples, and the generated out-of-distribution samples, to minimize a loss function on the in-distribution samples to maximize likelihood of the samples belonging to the class of the generative model 114, and to maximize the loss function on both the sampled out-of-distribution samples and the generated out-of-distribution samples to minimize likelihood of the samples not belonging to the class of the generative model 114.

At operation 312, the set of K generative models 114, as trained, are used to classify sensor data with respect to the K classes. In an example, the sensor data may be received from a wide variety of sensors, such as video, radar, LiDAR, ultrasonic, and/or motion sensors. Using the generative models 114, the sensor data may be accurately classified into the K classes. Based on the classification of the sensor data, the system 100 may compute one or more control signals for controlling a physical system, such as a computer-controlled machine, like a robot, a vehicle, a domestic appliance, a power tool, a manufacturing machine, a personal assistant, or an access control system. After operation 312, the process 300 ends.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A method for training a set of reciprocating generative models for K classes, the method comprising:
    initializing a set of K generative models that classifies sensor data into the K classes, such that when trained, each of the generative models of the set of K generative models is configured to classify an example in or out of a respective one of the K classes;
    for each generative model of the K generative models, sampling, from training data, in-distribution samples for the generative model as being classified as belonging to the class of the generative model, sampling, from the training data, out-of-distribution samples for the generative model as being classified as not belonging to the class of the generative model, generating out-of-distribution samples from each remaining reciprocal generative model in the set of reciprocating generative models excluding the generative model to provide additional samples classified as not belonging to the class of the generative model, and updating parameters of the generative model, according to the in-distribution samples, the out-of-distribution samples, and the generated out-of-distribution samples, to minimize a loss function on the in-distribution samples to maximize likelihood of the samples belonging to the class of the generative model, and to maximize the loss function on both the sampled out-of-distribution samples and the generated out-of-distribution samples to minimize likelihood of the samples not belonging to the class of the generative model; and utilizing the set of K generative models, as trained, for classifying sensor data with respect to the K classes.

2. The method of claim 1, further comprising utilizing, in the updating of the parameters of each of the generative models, (i) a balancing factor between in-distribution samples and out-of-distribution samples, and (ii) a balancing factor between real samples and synthetic samples.

3. The method of claim 1, wherein the parameters of the generative model are updated according to the equation:

$$\theta_i \leftarrow \arg\min_\theta L(\theta, X_{in}) - \lambda\left(\tau_1 L(\theta, X_{out}) + \tau_2 L(\theta, X_{out_{gen}})\right),$$

where $\theta_i$ is the respective generative model, $\lambda$ is a balancing factor between in-distribution samples and out-of-distribution samples, $\tau_1$, $\tau_2$ are balancing factors between real out-of-distribution samples from the training data and generated out-of-distribution samples, L is a loss function, $X_{in}$ is the in-distribution samples, $X_{out}$ is the real out-of-distribution samples, and $X_{out\_gen}$ is the generated out-of-distribution samples.

4. The method of claim 1, wherein the sensor data is received by one or more of a video sensor, a radar sensor, a LiDAR sensor, an ultrasonic sensor or a motion sensor.

5. The method of claim 1, further comprising controlling one or more of a robot, a vehicle, a domestic appliance, a power tool, a manufacturing machine, a personal assistant, or an access control system responsive to a signal generated based on the classifying of the sensor data with respect to the K classes.

6. The method of claim 1, wherein the set of K generative models are initialized to random values prior to learning.

7. A system for training a set of reciprocating generative models for K classes, the system comprising:

a processor of a computing device, the processor programmed to initialize a set of K generative models that classifies sensor data into the K classes, such that when trained, each of the generative models of the set of K generative models is configured to classify an example in or out of a respective one of the K classes;

for each generative model of the K generative models, sample, from training data, in-distribution samples for the generative model as being classified as belonging to the class of the generative model, sample, from the training data, out-of-distribution samples for the generative model as being classified as not belonging to the class of the generative model, generate out-of-distribution samples from each remaining reciprocal generative model in the set of reciprocating generative models excluding the generative model to provide additional samples classified as not belonging to the class of the generative model, and update parameters of the generative model, according to the in-distribution samples, the out-of-distribution samples, and the generated out-of-distribution samples, to minimize a loss function on the in-distribution samples to maximize likelihood of the samples belonging to the class of the generative model, and to maximize the loss function on both the sampled out-of-distribution samples and the generated out-of-distribution samples to minimize likelihood of the samples not belonging to the class of the generative model; and utilize the set of K generative models, as trained, to classify sensor data with respect to the K classes.

8. The system of claim 7, wherein the processor is further programmed to utilize, to update the parameters of each of the generative models, (i) a balancing factor between in-distribution samples and out-of-distribution samples, and (ii) a balancing factor between real samples and synthetic samples.

9. The system of claim 7, wherein the processor is further programmed to update the parameters of the generative model according to the equation:

$$\theta_i \leftarrow \arg\min_\theta L(\theta, X_{in}) - \lambda\left(\tau_1 L(\theta, X_{out}) + \tau_2 L(\theta, X_{out_{gen}})\right),$$

where $\theta_i$ is the respective generative model, $\lambda$ is a balancing factor between in-distribution samples and out-of-distribution samples, $\tau_1$, $\tau_2$ are balancing factors between real out-of-distribution samples from the training data and generated out-of-distribution samples, L is a loss function, $X_{in}$ is the in-distribution samples, $X_{out}$ is the real out-of-distribution samples, and $X_{out\_gen}$ is the generated out-of-distribution samples.

10. The system of claim 7, wherein the processor is further programmed to receive the sensor data from one or more of a video sensor, a radar sensor, a LiDAR sensor, an ultrasonic sensor or a motion sensor.

11. The system of claim 7, wherein the processor is further programmed to control one or more of a robot, a vehicle, a domestic appliance, a power tool, a manufacturing machine, a personal assistant, or an access control system responsive to a signal generated based on the sensor data as classified with respect to the K classes.

12. The system of claim 7, wherein the processor is further programmed to initialize the set of K generative models to random values prior to learning.

13. A non-transitory computer-readable medium comprising instructions for training a set of reciprocating generative models for K classes that, when executed by a processor, cause the processor to perform operations including to:

initialize a set of K generative models that classifies sensor data into the K classes, such that when trained, each of the generative models of the set of K generative models is configured to classify an example in or out of a respective one of the K classes;

for each generative model of the K generative models,
sample, from training data, in-distribution samples for the generative model as being classified as belonging to the class of the generative model,
sample, from the training data, out-of-distribution samples for the generative model as being classified as not belonging to the class of the generative model,
generate out-of-distribution samples from each remaining reciprocal generative model in the set of reciprocating generative models excluding the generative model to provide additional samples classified as not belonging to the class of the generative model, and
update parameters of the generative model, according to the in-distribution samples, the out-of-distribution samples, and the generated out-of-distribution samples, to minimize a loss function on the in-distribution samples to maximize likelihood of the samples belonging to the class of the generative model, and to maximize the loss function on both the sampled out-of-distribution samples and the generated out-of-distribution samples to minimize likelihood of the samples not belonging to the class of the generative model; and utilize the set of K generative models, as trained, to classify sensor data with respect to the K classes.

14. The medium of claim 13, wherein the instructions further cause the processor to perform operations including to utilize, to update the parameters of each of the generative models, (i) a balancing factor between in-distribution samples and out-of-distribution samples, and (ii) a balancing factor between real samples and synthetic samples.

15. The medium of claim 13, wherein the instructions further cause the processor to perform operations including to update the parameters of the generative model according to the equation:

$$\theta_i \leftarrow \arg\min_{\theta} L(\theta, X_{in}) - \lambda\bigl(\tau_1 L(\theta, X_{out}) + \tau_2 L(\theta, X_{out_{gen}})\bigr),$$

where $\theta_i$ is the respective generative model, $\lambda$ is a balancing factor between in-distribution samples and out-of-distribution samples, $\tau_1$, $\tau_2$ are balancing factors between real out-of-distribution samples from the training data and generated out-of-distribution samples, L is a loss function, $X_{in}$ is the in-distribution samples, $X_{out}$ is the real out-of-distribution samples, and $X_{out\_gen}$ is the generated out-of-distribution samples.

16. The medium of claim 13, wherein the instructions further cause the processor to perform operations including to receive the sensor data from one or more of a video sensor, a radar sensor, a LiDAR sensor, an ultrasonic sensor or a motion sensor.

17. The medium of claim 13, wherein the instructions further cause the processor to perform operations including to control one or more of a robot, a vehicle, a domestic appliance, a power tool, a manufacturing machine, a personal assistant, or an access control system responsive to a signal generated based on the sensor data as classified with respect to the K classes.

18. The medium of claim 13, wherein the instructions further cause the processor to perform operations including to initialize the set of K generative models to random values prior to learning.

* * * * *